United States Patent
Wang et al.

(10) Patent No.: US 12,439,405 B2
(45) Date of Patent: Oct. 7, 2025

(54) POSITIONING INFORMATION TRANSMISSION METHOD AND APPARATUS, TERMINAL, AND NETWORK-SIDE DEVICE

(71) Applicant: VIVO MOBILE COMMUNICATION CO., LTD., Guangdong (CN)

(72) Inventors: Yuanyuan Wang, Guangdong (CN); Huaming Wu, Guangdong (CN); Ye Si, Guangdong (CN); Zixun Zhuang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 390 days.

(21) Appl. No.: 18/147,561

(22) Filed: Dec. 28, 2022

(65) Prior Publication Data
US 2023/0140333 A1   May 4, 2023

Related U.S. Application Data

(63) Continuation of application No. PCT/CN2021/103586, filed on Jun. 30, 2021.

(30) Foreign Application Priority Data

Jul. 3, 2020 (CN) .......................... 202010635012.7

(51) Int. Cl.
*H04W 72/1268* (2023.01)
*H04W 72/23* (2023.01)
(Continued)

(52) U.S. Cl.
CPC ....... *H04W 72/1268* (2013.01); *H04W 72/23* (2023.01); *H04W 72/51* (2023.01); *H04W 72/566* (2023.01)

(58) Field of Classification Search
CPC . H04W 72/1268; H04W 72/23; H04W 72/51; H04W 72/566; H04W 64/00; H04W 4/02; H04L 5/0053; H04L 5/0069
See application file for complete search history.

(56) References Cited

U.S. PATENT DOCUMENTS 9,077,416 B2 *  7/2015  Liang .................... H04L 5/0053
2015/0011236 A1   1/2015  Kazmi et al.
(Continued)

FOREIGN PATENT DOCUMENTS

CN      102045861 A    5/2011
CN      104105200 A   10/2014
(Continued)

OTHER PUBLICATIONS

European Patent Office "Extended European Search Report" From Application No. 21832179.2, dated Nov. 6, 2023, pp. 7.
(Continued)

*Primary Examiner* — Afshawn M Towfighi
(74) *Attorney, Agent, or Firm* — Fredrikson & Byron, P.A.

(57) ABSTRACT

This application discloses an information transmission method and apparatus, a terminal, and a network-side device, which belongs to the field of communications technology. The information transmission method of this application includes: determining a physical channel used for transmitting positioning information, where the physical channel includes at least one of a physical uplink control channel PUCCH or a physical uplink shared channel PUSCH; and sending the physical channel, where the positioning information is mapped to the physical channel.

18 Claims, 4 Drawing Sheets

(51) Int. Cl.
*H04W 72/51* (2023.01)
*H04W 72/566* (2023.01)

(56) References Cited

U.S. PATENT DOCUMENTS

| | | | |
|---|---|---|---|
| 2015/0296339 A1 | 10/2015 | Woo et al. | |
| 2015/0327224 A1* | 11/2015 | Guan | H04L 5/0073 370/329 |
| 2020/0112391 A1* | 4/2020 | Yang | H04L 5/0053 |
| 2020/0305168 A1* | 9/2020 | Liou | H04L 5/0098 |
| 2021/0314904 A1* | 10/2021 | Duan | H04W 24/10 |
| 2023/0040590 A1* | 2/2023 | Manolakos | H04W 24/10 |
| 2023/0065668 A1* | 3/2023 | Manolakos | H04L 5/0051 |
| 2023/0086108 A1* | 3/2023 | Manolakos | H04W 64/00 455/456.1 |

FOREIGN PATENT DOCUMENTS

| | | |
|---|---|---|
| CN | 105517158 A | 4/2016 |
| CN | 108605339 A | 9/2018 |
| CN | 109964434 A | 7/2019 |
| CN | 110636550 A | 12/2019 |
| CN | 110661601 A | 1/2020 |
| CN | 111082907 A | 4/2020 |
| EP | 3200527 A1 | 8/2017 |
| EP | 3402283 A1 | 11/2018 |
| GR | 2020-0100115 * | 2/2020 |
| WO | 2021167689 A1 | 8/2021 |

OTHER PUBLICATIONS

Qualcomm Inc. "Positioning Enhancements", 3GPP TSG RAN Meeting #86 RP-193237, Dec. 12, 2019, 4 pgs.
International Patent Application No. PCT/CN2021/103586, International Search Report and Written Opinion with Partial English Machine Translation mailed Sep. 29, 2021, 9 pages.

* cited by examiner

POSITIONING INFORMATION TRANSMISSION METHOD AND APPARATUS, TERMINAL, AND NETWORK-SIDE DEVICE

CROSS-REFERENCE TO RELATED APPLICATIONS

This application is a continuation of International Application No. PCT/CN2021/103586, filed on Jun. 30, 2021, which claims priority to Chinese Patent Application No. 202010635012.7 filed on Jul. 3, 2020, which are incorporated herein by reference in their entireties.

TECHNICAL FIELD

The present disclosure relates to the field of communications technologies, and in particular, to an information transmission method and apparatus, a terminal, and a network-side device.

BACKGROUND

In related art, when reporting location information, the location information is reported through an LTE positioning protocol (LPP) or a new radio positioning protocol (NRPPa). In a reporting method for the location information, the currently scheduled resource is difficult to match with a reporting requirement of positioning information, causing the positioning information to fail to be uploaded on the currently scheduled resource, and high-layer parsing is required. As a result, reporting of the positioning information has a relatively long latency and is difficult to control, and it is difficult to meet a low-latency location service.

SUMMARY

According to a first aspect of the present disclosure, an information transmission method is provided, applied to a terminal, the method including:
determining a physical channel used for transmitting positioning information, where the physical channel includes at least one of a physical uplink control channel PUCCH or a physical uplink shared channel PUSCH; and
sending the physical channel, where the positioning information is mapped to the physical channel.

According to a second aspect of the present disclosure, a channel monitoring apparatus is provided, applied to a terminal, the apparatus including:
a first determining module, configured to determine a physical channel used for transmitting positioning information, where the physical channel includes at least one of a physical uplink control channel PUCCH or a physical uplink shared channel PUSCH; and
a first sending module, configured to send the physical channel, where the positioning information is mapped to the physical channel.

According to a third aspect of the present disclosure, an information transmission method is provided, applied to a network-side device, the method including:
receiving a physical channel to which positioning information is mapped, where the physical channel includes at least one of a physical uplink control channel PUCCH or a physical uplink shared channel PUSCH.

According to a fourth aspect of the present disclosure, a channel transmission apparatus is provided, applied to a network-side device, the apparatus including:
a receiving module, configured to receive a physical channel to which positioning information is mapped, where the physical channel includes at least one of a physical uplink control channel PUCCH or a physical uplink shared channel PUSCH.

According to a fifth aspect of the present disclosure, a terminal is provided, including a processor, a memory, and a program or instruction stored in the memory and executable on the processor, where the program or instruction, when executed by the processor, implements the steps of the method according to the first aspect.

According to a sixth aspect of the present disclosure, a network-side device is provided, including a processor, a memory, and a program or instruction stored on the memory and executable on the processor, where the program or instruction, when executed by the processor, implements the steps of the method according to the third aspect.

According to a seventh aspect of the present disclosure, a readable storage medium is provided, storing a program or instruction, where the program or instruction, when executed by a processor, implements the steps of the method according to the first aspect; or implements the steps of the method according to the third aspect.

According to an eighth aspect of the present disclosure, a chip is provided, including a processor and a communication interface, where the communication interface is coupled to the processor, and the processor is configured to run a program or instruction on a network-side device to implement the steps of the method according to the first aspect, or implement the steps of the method according to the third aspect.

According to a ninth aspect of the present disclosure, a computer software product is provided, being stored in a non-volatile storage medium, where the computer software product is configured to be executed by at least one processor to implement the steps of the method according to the first aspect, or implement the steps of the method according to the third aspect.

According to a tenth aspect of the present disclosure, a communication device is provided, configured to perform the method according to the first aspect, or perform the method according to the third aspect.

DETAILED DESCRIPTION

The technical solutions in the embodiments of this application are clearly described in the following with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

In the specification and claims of this application, terms "first" and "second" are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

It should be noted that the technology described in this embodiment of this application is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms "system" and "network" in this embodiment of this application are often used interchangeably, and the described technologies may be used both for the systems and radio technologies mentioned above and may also be used for other systems and radio technologies. However, the following descriptions describe a new radio (NR) system for the objective of being used as an example, and NR terms are used in most of the descriptions below. These technologies may also be applied to applications other than NR system applications, such as a 6th generation (6G) communication system.

Figure 1:
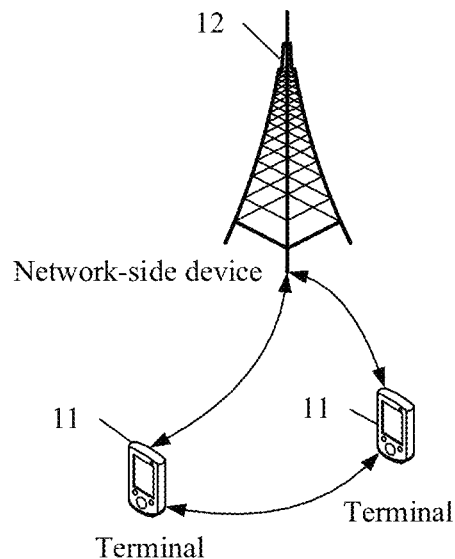
FIG. 1 is a structural diagram of a network system to which an embodiment of this application may be applied.

FIG. 1 is a block diagram of a wireless communication system to which an embodiment of this application may be applied. The wireless communication system includes a terminal 11 and a network-side device 12. The terminal 11 may also be referred to as a terminal device or user equipment (UE). The terminal 11 may be a terminal-side device such as a mobile phone, a tablet computer, a laptop computer, or referred to as a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment, (PUE). The wearable device includes: a bracelet, headphones, glasses, or the like. It should be noted that, in this embodiment of this application, a specific type of the terminal 11 is not limited. The network-side device 12 may be a base station or a core network, where the base station may be referred to as a node B, an evolved node B (eNB), an access point, a base transceiver station (BTS), a radio base station, a radio transceiver, a basic service set (BSS), an extended service set (ESS), a household B node, a household evolved B node, a wireless local area network (WLAN) access point, a wireless fidelity (WiFi) node, a transmitting receiving point (TRP) or some other proper terms in the field. Provided that the same technical effect is achieved, the base station is not limited to a specific technical vocabulary. It should be noted that, in this embodiment of this application, only a base station in the NR system is used as an example, but a specific type of the base station is not limited.

The information transmission method provided in this embodiment of this application is described in detail below by using specific embodiments and application scenarios with reference to the accompanying drawings.

Figure 2:
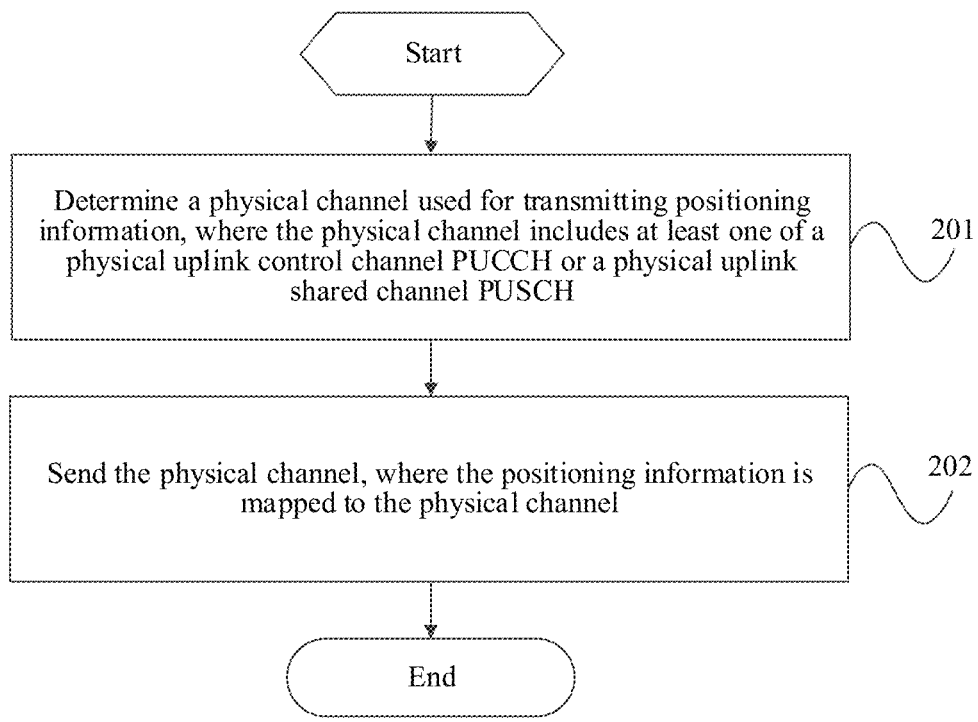
FIG. 2 is a schematic flowchart 1 of an information transmission method according to an embodiment of this application.

As shown in FIG. 2, this embodiment of this application provides an information transmission method, applied to a terminal, the method including:

Step 201. Determine a physical channel used for transmitting positioning information, where the physical channel includes at least one of a physical uplink control channel (PUCCH) and a physical uplink shared channel (PUSCH).

Optionally, the PUSCH includes a configured grant PUSCH.

Optionally, the positioning information includes at least one of the following:
  location information;
  location measurement information; or
  positioning state information.

It should be noted that, when the positioning information includes the location information and/or the location measurement information, the terminal needs to first encrypt the location information and/or the location measurement information, and then, transmit the location information and/or the location measurement information to a network-side device (for example, a base station, a transmission and reception point TRP, or the like). Because the network-side device does not have a corresponding key, after receiving the encrypted location information and/or location measurement information, the network-side device transmits the encrypted location information and/or location measurement information to a network-side device (such as a location server, a location management function (LMF), or the like), to be decrypted by the network-side device (such as the location server, the LMF, or the like).

Alternatively, when the positioning information includes the location information and/or the location measurement information, the location information first passes through an LPP or NRPP entity, and is then mapped to the physical channel. The network-side device (such as a base station, a TRP, or the like) does not need to be parsed. Optionally, the network-side device (such as a base station, a TRP, or the like) supplements the rest of protocol stack and forwards the rest of the protocol stack to a network-side device (such as a location server, an LMF, or the like).

Optionally, the positioning state information includes at least one of the following:
  a spatial relation, where an update is requested if not appropriate; it should be noted that, the spatial relation may be a spatial relation of an uplink positioning signal, and may also be a spatial relation of a downlink positioning signal;
  positioning auxiliary information, where if not appropriate, an update is requested;
  related information of a path loss reference signal, where for example, the path loss reference signal cannot be measured;

a resource request, where the resource request may include a resource request of the positioning information and/or a resource request of the positioning signal; it should be noted that, the resource request may indicate that the resource is used for positioning or used for positioning information, and further, the resource request may indicate which type of positioning information the resource is used for;

a size of a resource request, where the size of the resource request indicates a volume required by a terminal on a network side;

a reported location information type;

information indicating an insufficient resource;

information indicating that a positioning signal or positioning auxiliary information is not received;

information indicating that enough positioning signals or enough positioning auxiliary information is not received;

relationship information of a reporting resource and a measurement window, where the relationship information may be match, mismatch, or time offset information; it should be noted that, when the reporting resource, measurement window, or measurement reporting time configured by the base station is not matched, notifying the base station of the corresponding offset;

relationship information of a reporting resource and a measurement time, where the relationship information may be match, mismatch, or time offset information; it should be noted that, when the reporting resource, measurement time, or measurement reporting time configured by the base station is not matched, notifying the base station of the corresponding offset; or hybrid automatic retransmission request HARQ information.

Optionally, the location information and location measurement information may be obtained through observed time difference of arrival (OTDOA), a global navigation satellite system (GNSS), a downlink time difference of arrival (TDOA), an uplink time difference of arrival (TDOA), an uplink Bluetooth angle of arrival (AoA), a Bluetooth angle of departure (AoD), Bluetooth, a sensor, or wifi.

Optionally, different physical channels are selected according to different positioning information. For example, positioning information with relatively less information content (such as positioning state information or absolute location information) may be mapped to the PUCCH, and other information or positioning information with relatively large bits (such as location measurement information) may only be mapped to the PUSCH.

In this embodiment of this application, a period type of the physical channel includes aperiodic, semi-persistent, or periodic.

It should be noted that, the period type of the physical channel is the same as a period type of the measured positioning reference signal, or the period type of the physical channel is consistent with a reporting type of a positioning request.

Further, if a quantity of times that is reported or a period value is specified in the positioning reference signal or a reporting request, the period type of the physical channel may also be consistent with or similar to the positioning reference signal or the reporting request. Optionally, when the reporting request expires, the physical channel may be deactivated, deconfigured, released, or changed.

In another embodiment of this application, the physical channel does not have a corresponding period type, and a proper physical channel is selected to transmit the positioning information; and in still another embodiment of this application, the physical channel has a corresponding period type, but is different from the period type of the positioning information, or other requirements are different. The positioning state information may be first sent to the network side to request resource allocation that conforms to the configuration, or is directly transmitted on the current physical channel.

Step 202. Send the physical channel, where the positioning information is mapped to the physical channel.

Optionally, in this embodiment of this application, the positioning information is mapped to the PUCCH, and/or the positioning information is multiplexed or mapped to at least one of the PUSCH and the configured grant PUSCH. Multiplexing refers to multiplexing the positioning information to a location in the PUSCH for transmitting control information. Mapping may be understood as data or a release 16 mapping manner being still used. That is, the positioning information needs to go through high-layer entities (such as a medium access control (MAC) entity, a radio link control (RLC) entity, a packet data convergence protocol (PDCP) entity, a radio resource control (RRC) entity, an LPP entity, or the like), and is then mapped to the physical channel.

When sending the physical channel, the physical channel may be sent according to at least one of a priority of the positioning information, a mapping priority of the positioning information, and a transmission priority used for transmitting the positioning information.

In the information transmission method of this embodiment of this application, positioning information is reported through at least one of a PUCCH, a PUSCH, and a configured grant PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted through the PUCCH or multiplexed to the PUSCH for transmission, high-layer parsing is not required, which may effectively reduce a reporting latency, thereby meeting a low-latency location service.

Optionally, the determining a physical channel used for transmitting positioning information includes:

determining the physical channel used for transmitting the positioning information according to first information; and the first information includes at least one of the following:

feature information of the positioning information; or feature information of the physical channel.

Further, optionally, the feature information of the positioning information includes at least one of the following:

a periodicity feature of the positioning information, content of the positioning information, or a priority of the positioning information; and/or the feature information of the physical channel includes at least one of the following:

a type of the physical channel, a scheduling time of the physical channel, or a scheduling resource of the physical channel.

In an embodiment of this application, according to the feature information of the positioning information, it is determined whether the positioning information is uploaded in the PUSCH or the PUCCH. For example, according to the aperiodic, periodic, or semi-persistent features of the positioning information, it is determined whether the positioning information is uploaded in the PUSCH or the PUCCH. Further, it may be further determined whether the positioning information is multiplexed or mapped to the PUSCH, or mapped to the PUSCH in the order of priority of the MAC. In another example, according to the content of the positioning information (such as a size of a bit), it is determined whether the positioning information is uploaded in the PUSCH or the PUCCH; and in still another example, according to the priority of the positioning information, it is determined whether the positioning information is uploaded in the PUCCH or the PUSCH. For example, the high-priority positioning information is transmitted in the PUSCH.

In an embodiment of this application, the priority of the positioning information and the scheduling time of the PUCCH and the PUSCH may further be combined to transmit the physical channel at an earlier moment of the scheduling time; and the positioning information may further be transmitted according to the priority of the positioning information, the scheduling time of the PUCCH and the PUSCH, and the scheduling resources of the PUCCH and the PUSCH. For example, the high-priority positioning information is transmitted in the first resource that meets the transmission requirement. For example, if there are two uplink cells (carrier) at the same time, the physical channel of the cell of the positioning information (such as a non-supplementary uplink (Supplementary Uplink, SUL)) of a cell is selected to upload.

Optionally, the sending the physical channel includes:
according to a mapping rule, mapping the positioning information to the physical channel, and sending the physical channel, where
the mapping rule includes a first mapping rule specified in a protocol, a second mapping rule indicated by higher layer signaling, or a third mapping rule indicated by downlink control information (DCI).

For example, according to a first mapping rule, the positioning information is mapped to a preset location of the physical channel, where the first mapping rule may be specified in a protocol. It should be noted that, the preset location of the physical channel includes at least one of the following: the first N symbols, the last N symbols, the first N symbols of demodulation reference signal (DMRS), or the last N symbols of the DMRS, where the N≥1; or according to a second mapping rule indicated by the higher layer signaling, the positioning information is mapped to the physical channel, where the higher layer indication signaling may be used for indicating whether mapping is allowed, or how to map. The higher layer signaling is sent by the network-side device according to the capability reported by the terminal, and in a case that the capability reported by the terminal is to support mapping the positioning information to the physical channel, the higher layer signaling indicates that mapping is allowed and indicates how to map; or according to a third mapping rule indicated by the downlink control information DCI, the positioning information is mapped to the physical channel. In addition, the DCI may further be used for indicating transmitting the positioning information in the PUCCH or mapping or multiplexing the positioning information to the PUSCH. The DCI is sent by the network-side device according to the capability reported by the terminal, and in a case that the capability reported by the terminal is to support mapping the positioning information to the physical channel, the DCI is sent.

Optionally, the sending the physical channel includes:
determining a mapping priority of the positioning information; and
according to the mapping priority of the positioning information, mapping the positioning information to the physical channel, and sending the physical channel.

Further, optionally, the according to the mapping priority of the positioning information, mapping the positioning information to the physical channel includes:
in a case that the mapping priority of the positioning information is higher than a mapping priority of first information, preferentially mapping the positioning information to the physical channel, where the first information is information that needs to be mapped to the physical channel.

For example, a mapping (multiplexing) priority of the positioning information>a mapping priority of a hybrid automatic repeat request (HARQ)>a mapping priority of a CSI part 1>a mapping priority of a CSI part 2, the positioning information is preferentially mapped to the physical channel. Then, the HARQ is mapped to the physical channel, next, the CSI part 1 is mapped to the physical channel, and finally, the CSI part 2 is mapped to the physical channel.

In this embodiment of this application, a mapping priority relationship between the positioning information and the HARQ, the CSI part 1, and the CSI part 2 is not limited to the foregoing relationship, and may include all arrangement and combination of the four.

Optionally, the determining the mapping priority of the positioning information includes: determining the mapping priority of the positioning information according to features of the positioning information, and/or a protocol agreement, where for example, a priority of aperiodic positioning information is higher than a priority of periodic or semi-persistent positioning information; or determining the mapping priority of the positioning information according to second information sent by a network device, features of the positioning information, and/or a protocol agreement.

For example, when it is determined that mapping priorities of the two pieces of positioning information are the same according to the second indication information sent by the network device, priorities of the two pieces of positioning information may be further determined according to the features of the positioning information. When it is determined that the mapping priorities of the two pieces of positioning information are different according to the second indication information sent by the network device, the mapping priorities of the two pieces of positioning information may be determined based only on the second information.

In an embodiment of this application, when different positioning information are not consistent (for example, two pieces of positioning information need to be simultaneously mapped to a physical channel), the mapping priority of the positioning information may be determined according to the priority of the positioning information (which may be specified in a protocol or dynamically indicated). The priority of the positioning information may further be determined according to a preset priority function. For example, high-priority positioning information (that is, a small function value) may be preferentially multiplexed or mapped to a physical channel (and may also be a physical channel that determines which piece of positioning information is carried by the transmission), or high-priority positioning information is multiplexed or mapped to the physical channel at an earliest moment of a (sending time), or high-priority positioning information is preferentially multiplexed to a specific physical channel (for example, the positioning information is preferentially multiplexed to the PUSCH or the PUCCH, and remaining resource transmits data information, and/or other control information); and the priority of the positioning information may further be determined according to the content (or type) of the positioning information. Therefore, the mapping priority may be determined according to the content (or type) of the positioning information. For example, the mapping priority reported by the aperiodic location is higher than the mapping priority reported by the semi-persistent and periodic location.

Optionally, the sending the physical channel includes:
sending the physical channel according to a transmission priority of the physical channel used for transmitting the positioning information.

For example, a plurality of physical channels transmit the same or different positioning information. If the PUCCH carries the positioning information, the PUSCH carries the positioning information, and a sounding reference signal (SRS) carries signals used for positioning, the PUCCH, the PUSCH, or the SRS are preferentially sent according to the transmission priority of the PUCCH, the PUSCH, and the SRS. A transmission priority relationship among the PUCCH carrying the positioning information, the PUSCH carrying the positioning information, and the SRS carrying the positioning signals is not specifically limited herein.

In an embodiment of this application, if the PUCCH carrying the positioning information is inconsistent with the PUSCH, the positioning information may be multiplexed to the PUSCH for transmission, or the PUSCH may be discarded to transmit the PUCCH. Further, if the PUCCH overlaps with a plurality of PUSCHs, the PUCCH is multiplexed to a PUSCH according to the rules.

In an embodiment of this application, if the PUSCH 1 carrying the positioning information 1 is inconsistent with the PUSCH 2 carrying the positioning information 2, the positioning information 1 and the positioning information 2 may be multiplexed to one of the PUSCHs for transmission.

Further, optionally, the transmission priority is determined according to a priority of the physical channel, features of the positioning information, and/or second information sent by a network device.

Optionally, the second information is used for indicating at least one of the following:
the priority of the physical channel used for transmitting the positioning information;
a priority of the positioning information; or
the mapping priority of the positioning information.

The information transmission method of this embodiment of this application further includes: receiving the second information.

Optionally, the second information is carried by request information of the positioning information, or the second information is carried by downlink control information DCI, or the second information is carried by a radio resource control RRC message, or the second information is carried by a MAC message.

For example, the priority may be indicated by the priority of the HARQ carried by the DCI, or the priority is determined by the priority directly indicated by the N1 (N1≥1) bit in the DCI; or, the priority may be further indicated by the priority of the configured grant PUSCH (CG PUSCH) carried through the RRC message, such as phy-PriorityIndex-r16, and further, the second information may further be second physical layer indication information, which is used for indicating the priority of the positioning information, and/or the priority relationship of other PUSCH information; and the second information may further be the priority of the corresponding positioning reference signal, for example, the priority of activating the measurement of the corresponding positioning reference signal.

In this embodiment of this application, at least one of the priority of the positioning information, the mapping priority of the positioning information, and the priority of the physical channel used for transmitting the positioning information is clarified, so that after obtaining the uplink resource, the terminal may transmit the positioning information on the corresponding resource according to the clarified priority, which may effectively shorten the reporting latency. In addition, when the positioning information is transmitted through the configured grant PUSCH, the network-side device may obtain the reporting time of the positioning information, so that the network device may obtain the positioning information within the needs of the time domain, implementing controllable reporting latency, and effectively shortening the reporting latency.

Optionally, the priority of the positioning information includes at least a first priority and a second priority; and
a transmission priority of positioning information of the first priority is higher than a transmission priority of at least one of the following:
a physical channel that transmits positioning information of the second priority;
a demodulation reference signal;
a physical uplink shared channel PUSCH;
a physical uplink control channel PUCCH;
a demodulation reference signal of a fourth priority, where a priority of the demodulation reference signal includes a third priority and the fourth priority, and the third priority is higher than the fourth priority;
a PUSCH of a sixth priority, where the PUSCH includes a fifth priority and the sixth priority, and the fifth priority is higher than the sixth priority; or
a PUCCH of an eighth priority, where the PUCCH includes a seventh priority and the eighth priority, and the seventh priority is higher than the eighth priority.

Optionally, there are N priorities of the positioning information; and the order of the priority sequentially decreases.

Optionally, the priority of the positioning information is determined according to a priority function, and the preset priority function is related to at least one of the following:
a type of the positioning information;
a periodicity feature of the positioning information;
content of the positioning information;
a request indication of the positioning information;
an index of a serving cell;
an index of the positioning information; or
a reporting index of the positioning information.

The priority function may be a function similar to a function corresponding to the priority rule reported by the channel state information (CSI).

Optionally, the sending the physical channel according to a transmission priority of the physical channel used for transmitting the positioning information includes:
in a case that at least two resources overlap, sending a first resource according to transmission priorities of the at least two resources, where
the first resource is the physical channel used for transmitting the positioning information.

Optionally, in a case that at least two resources overlap, according to priorities of the at least two resources, a high-priority resource is preferentially transmitted, and/or a low-priority resource is discarded (transmitted later). For example, in a case that the at least two resources overlap, if the transmission priority of the first resource is higher than the transmission priority of the second resource, the first resource is preferentially sent, and the second resource is discarded; and if the transmission priority of the first resource is lower than the transmission priority of the second resource, the second resource is preferentially sent, and the first resource is transmitted later (that is, after the second resource is sent, the first resource is sent).

Optionally, in a case that at least two resources overlap, according to the priority of the at least two resources, a high-priority resource is preferentially transmitted, and/or the positioning information is multiplexed to the high-priority resource. For example, in a case that the at least two resources overlap, if the transmission priority of the first resource is higher than the transmission priority of the second resource, the first resource is preferentially sent, and if the second resource carries the positioning information, the positioning information is multiplexed to the first resource.

Optionally, the at least two resources include the first resource and a second resource; and a combination of the first resource and the second resource includes at least one of the following:

the first resource is the physical channel used for transmitting the positioning information, the second resource is a PUSCH used for transmitting first other information, and the first other information is information other than the positioning information;

the first resource is the physical channel used for transmitting the positioning information, and the second resource is a PUCCH used for transmitting the first other information;

the first resource is the physical channel used for transmitting the positioning information, and the second resource is a demodulation reference signal or an uplink positioning signal;

the first resource is a physical channel used for transmitting aperiodic positioning information, the second resource is a PUCCH used for transmitting second other information, and the second other information is information other than the aperiodic positioning information;

the first resource is the physical channel used for transmitting the aperiodic positioning information, and the second resource is a periodic or semi-persistent physical channel used for transmitting the positioning information;

the first resource is the physical channel used for transmitting the aperiodic positioning information, and the second resource is a PUSCH scheduled for transmitting the second other information; or the first resource is a resource corresponding to the physical channel used for transmitting the aperiodic positioning information, and the second resource is the demodulation reference signal or the uplink positioning signal.

In a combination of the first resource and the second resource, a transmission priority of the first resource is higher than a transmission priority of the second resource.

Optionally, the at least two resources include the first resource and a second resource; and the first resource is the physical channel used for transmitting the positioning information, and the second resource includes at least one of the following:

a PUSCH or a PUCCH carrying aperiodic channel state information CSI;

a PUSCH or a PUCCH carrying hybrid automatic repeat request acknowledgement (HARQ-ACK);

a PUSCH or a PUCCH carrying a scheduling request (SR);

a PUSCH or a PUCCH carrying a semi-persistent or periodic CSI report;

a PUSCH or a PUCCH carrying a periodic or semi-persistent layer 1 reference signal received power (L1-RSRP) report;

a PUSCH carrying a fifth priority, where the PUSCH includes the fifth priority and a sixth priority, and the fifth priority is higher than the sixth priority; or a PUCCH carrying a seventh priority, where the PUCCH includes the seventh priority and an eighth priority, and the seventh priority is higher than the eighth priority; a PUSCH carrying the sixth priority; or a PUCCH carrying the eighth priority.

A transmission priority of the first resource is lower than a transmission priority of the second resource.

Optionally, in a case that the physical channel used for transmitting the positioning information is the PUCCH, the positioning information further includes:

indication information, where the indication information is used for indicating that information to be reported is the location information or the location measurement information.

Further, optionally, the PUCCH may only upload the location information, or the PUCCH may only upload the periodic positioning information.

Further, optionally, the positioning information is determined according to a resource of the PUCCH, or the positioning information is determined according to a type of the PUCCH.

In this embodiment of this application, the positioning information may further be uploaded through a bit limit, such as limiting a transmitting receiving point (TRP) or a resource, a quantity of resource sets, or a quantity of frequency layers that is reported.

Further, optionally, there is a correspondence between the positioning information and bits used for transmitting the positioning information, and the correspondence is specified in a protocol.

Optionally, in a case that the physical channel used for transmitting the positioning information is the configured grant (CG) PUSCH, configuration information of the configured grant PUSCH includes at least one of the following:

a period, where for example, the period is consistent with the period of the positioning reporting request;

a time domain offset, where the time domain offset is related to a reference signal that needs to be measured, or is related to activating an activation signal that needs to be measured, or is related to the signaling that activates the configured grant resource;

a priority;

indication information, where the indication information may be used for indicating whether being used for reporting the configured grant PUSCH of the positioning information; or resource information, where the resource information is greater than or equal to the positioning information that needs to be reported.

Optionally, the information transmission method of this embodiment of this application further includes:

in a case that the physical channel used for transmitting the positioning information is the configured grant PUSCH, activating the configured grant PUSCH in at least one of the following manners;

activating the configured grant PUSCH through DCI scrambled by a configured scheduling radio network temporary identifier (CS-RNTI);

activating the configured grant PUSCH through RRC configuration;

simultaneously activating the configured grant PUSCH through activating reference signal measurement; or activating the configured grant PUSCH through a medium access control element MAC CE.

Optionally, the information transmission method of this embodiment of this application further includes:

in a case that the physical channel used for transmitting the positioning information is the configured grant PUSCH, deactivating the configured grant PUSCH in at least one of the following manners;

deactivating the configured grant PUSCH through DCI scrambled by a CS-RNTI;

deactivating the configured grant PUSCH through RRC reconfiguration;

simultaneously deactivating the configured grant PUSCH through deactivating reference signal measurement;

deactivating the configured grant PUSCH through a MAC control element (CE); or deactivating the configured grant PUSCH through timer expiration.

In the information transmission method of this embodiment of this application, positioning information is reported through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted through the PUCCH or multiplexed to the PUSCH for transmission, high-layer parsing is not required, which may effectively reduce a reporting latency, thereby meeting a low-latency location service.

Figure 3:
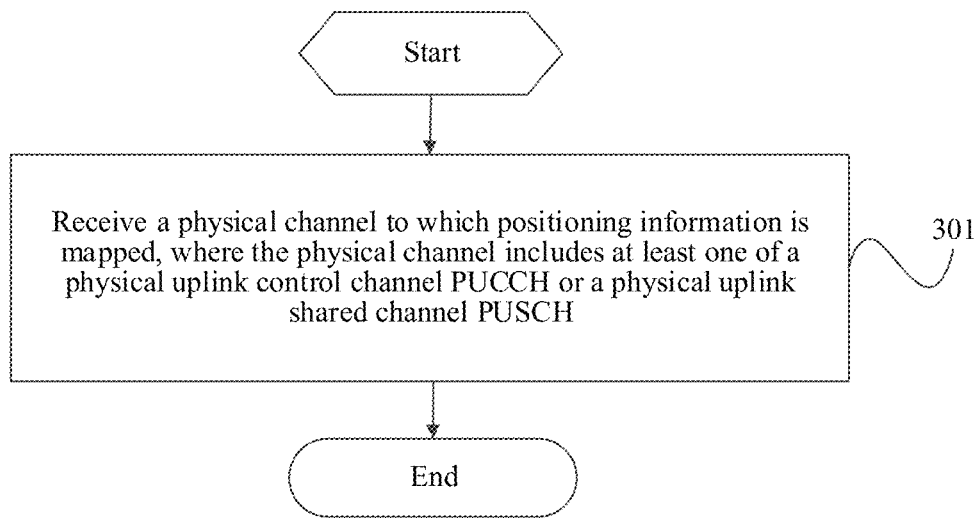
FIG. 3 is a schematic flowchart 2 of an information transmission method according to an embodiment of this application.

As shown in FIG. 3, this embodiment of this application further provides an information transmission method, applied to a network-side device, the method including:

step 301. Receive a physical channel to which positioning information is mapped, where the physical channel includes at least one of a physical uplink control channel PUCCH or a physical uplink shared channel PUSCH.

Optionally, the PUSCH includes a configured grant PUSCH. It should be noted that, when the positioning information includes location information and/or location measurement information, a terminal needs to first encrypt the location information and/or the location measurement information, and then transmit the location information and/or the location measurement information to the network-side device (such as a base station, a transmitting receiving point TRP, or the like). Because the network-side device does not have a corresponding key, after receiving encrypted location information and/or location measurement information, the network-side device transmits the encrypted location information and/or location measurement information to the network-side device (such as a location server, a location management function LMF, or the like), and the network-side device (such as a location server, an LMF, or the like) performs decryption processing.

Alternatively, when the positioning information includes the location information and/or the location measurement information, the terminal first passes through an LPP or NRPP entity, and is then mapped to the physical channel. The network-side device (such as a base station, a TRP, or the like) does not need to be parsed. Optionally, the rest of the protocol stack is supplemented and forwarded to the network-side device (such as a location server, an LMF, or the like). Optionally, in this embodiment of this application, the positioning information is mapped to the PUCCH, and/or the positioning information is multiplexed or mapped to at least one of the PUSCH and the configured grant PUSCH. Multiplexing refers to multiplexing the positioning information to a location in the PUSCH for transmitting control information. Mapping may be understood as data or a release 16 mapping manner being still used. That is, the data or the release 16 mapping manner needs to go through high-layer entities (such as a MAC entity, an RLC entity, a PDCP entity, an RRC entity, an LPP entity, or the like), and is then mapped to the physical channel.

Optionally, the physical channel is sent according to at least one of a priority of the positioning information, a mapping priority of the positioning information, and a transmission priority used for transmitting the positioning information. A network device receives the physical channel on which the positioning information is mapped according to at least one of the priority of the positioning information, the mapping priority of the positioning information, and the transmission priority used for transmitting the positioning information.

The priority of the positioning information, the mapping priority of the positioning information, and the transmission priority used for transmitting the positioning information have been described in detail in the method embodiment on the terminal side and are not repeated herein.

In the information transmission method of this embodiment of this application, positioning information reported by a terminal is received through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted or multiplexed to the PUSCH for transmission through the PUCCH, high-layer parsing is not required, which may effectively reduce a reporting latency, thereby meeting a low-latency location service.

Optionally, before the receiving a physical channel to which positioning information is mapped, the method further includes:

sending second information, where the second information is used for indicating at least one of the following:

the priority of the physical channel used for transmitting the positioning information;

a priority of the positioning information; or the mapping priority of the positioning information.

Optionally, the second information is carried by request information of the positioning information, or the second information is carried by downlink control information DCI, or the second information is carried by a radio resource control RRC message, or the second information is carried by a MAC message.

Optionally, before the receiving a physical channel to which positioning information is mapped, the method further includes:

sending higher layer indication signaling, where the higher layer indication signaling is used for instructing a terminal to map the positioning information to the physical channel according to a second mapping rule; or sending DCI, where the DCI is used for instructing a terminal to map the positioning information to the physical channel according to a third mapping rule.

Further, optionally, before sending the higher layer indication signaling, or sending the DCI, the method further includes obtaining a capability of the terminal, where the capability of the terminal includes a capability of whether supporting to map the positioning information to the physical channel.

In a case that the capability of the terminal supports to map the positioning information to the physical channel, the higher layer signaling is sent or the DCI is sent.

Optionally, the information transmission method of this embodiment of this application further includes:

in a case that the physical channel used for transmitting the positioning information is the configured grant PUSCH, sending at least one of the following activation signaling, where the activation signaling is used for activating the configured grant PUSCH;

DCI activation signaling scrambled by a CS-RNTI;

RRC activation signaling;

reference signal measurement activation signaling; or medium access control control element MAC CE activation signaling.

Optionally, the information transmission method of this embodiment of this application further includes:

in a case that the physical channel used for transmitting the positioning information is the configured grant PUSCH, sending at least one of the following deactivation signaling, where the deactivation signaling is used for deactivating the configured grant PUSCH;

DCI deactivation signaling scrambled by a CS-RNTI;

RRC deactivation signaling;

reference signal measurement deactivation signaling; or medium access control control element MAC CE deactivation signaling.

In the information transmission method of this embodiment of this application, positioning information reported by a terminal is received through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted or multiplexed to the PUSCH for transmission through the PUCCH, high-layer parsing is not required, which may effectively reduce a reporting latency, thereby meeting a low-latency location service.

It should be noted that, in the information transmission method provided in this embodiment of this application, the execution entity may be an information transmission apparatus, or a control module configured to perform the information transmission method in the information transmission apparatus. In the embodiments of this application, the information transmission apparatus performing the information transmission method is used as an example to describe the information transmission apparatus provided in this application.

Figure 4:
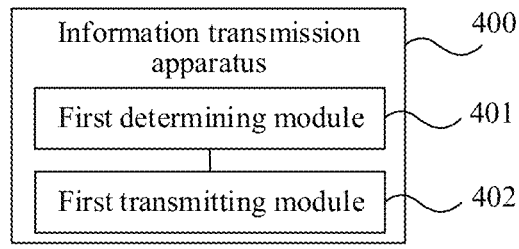
FIG. 4 is a schematic diagram 1 of a module of a channel transmission apparatus according to an embodiment of this application.

As shown in FIG. 4, this embodiment of this application further provides an information transmission apparatus 400, applied to a terminal, the method including:

a first determining module 401, configured to determine a physical channel used for transmitting positioning information, where the physical channel includes at least one of a physical uplink control channel PUCCH or a physical uplink shared channel PUSCH; and a first sending module 402, configured to send the physical channel, where the positioning information is mapped to the physical channel.

In an information transmission apparatus of this embodiment of this application, the PUSCH includes a configured grant PUSCH.

In an information transmission apparatus of this embodiment of this application, the positioning information includes at least one of the following:

location information;

location measurement information; or positioning state information.

In an information transmission apparatus of this embodiment of this application, the positioning state information includes at least one of the following:

a spatial relation;

positioning auxiliary information;

related information of a path loss reference signal;

a resource request;

a size of a resource request;

a reported location information type;

information indicating an insufficient resource;

information indicating that a positioning signal or positioning auxiliary information is not received;

information indicating that enough positioning signals or enough positioning auxiliary information is not received;

relationship information of a reporting resource and a measurement window;

relationship information of a reporting resource and a measurement time; or hybrid automatic retransmission request HARQ information.

In an information transmission apparatus of this embodiment of this application, the first determining module is configured to determine the physical channel used for transmitting the positioning information according to first information; and the first information includes at least one of the following:

feature information of the positioning information; or feature information of the physical channel.

In an information transmission apparatus of this embodiment of this application, the feature information of the positioning information includes at least one of the following:

a periodicity feature of the positioning information, content of the positioning information, or a priority of the positioning information; and/or the feature information of the physical channel includes at least one of the following:

a type of the physical channel, a scheduling time of the physical channel, or a scheduling resource of the physical channel.

In an information transmission apparatus of this embodiment of this application, the first sending module is configured to, according to a mapping rule, map the positioning information to the physical channel, and send the physical channel, where the mapping rule includes a first mapping rule specified in a protocol, a second mapping rule indicated by higher layer signaling, or a third mapping rule indicated by downlink control information DCI.

In an information transmission apparatus of this embodiment of this application, the first sending module includes:
a first determining submodule, configured to determine a mapping priority of the positioning information; and
a mapping submodule, configured to, according to the mapping priority of the positioning information, map the positioning information to the physical channel, and send the physical channel.

In an information transmission apparatus of this embodiment of this application, the mapping submodule is configured to preferentially map, in a case that the mapping priority of the positioning information is higher than a mapping priority of first information, the positioning information to the physical channel, where the first information is information that needs to be mapped to the physical channel.

In an information transmission apparatus of this embodiment of this application, the first determining submodule is configured to determine the mapping priority of the positioning information according to second information sent by a network device, features of the positioning information, and/or a protocol agreement.

In an information transmission apparatus of this embodiment of this application, the first sending module is configured to send the physical channel according to a transmission priority of the physical channel used for transmitting the positioning information.

In an information transmission apparatus of this embodiment of this application, the transmission priority is determined according to a priority of the physical channel, features of the positioning information, and/or second information sent by a network device.

In an information transmission apparatus of this embodiment of this application, the second information is used for indicating at least one of the following:
the priority of the physical channel used for transmitting the positioning information;
a priority of the positioning information; or
the mapping priority of the positioning information.

In an information transmission apparatus of this embodiment of this application, the second information is carried by request information of the positioning information, or the second information is carried by downlink control information DCI, or the second information is carried by a radio resource control RRC message, or the second information is carried by a media access layer control MAC message.

In an information transmission apparatus of this embodiment of this application, the priority of the positioning information includes at least a first priority and a second priority; and
a transmission priority of positioning information of the first priority is higher than a transmission priority of at least one of the following:
a physical channel that transmits positioning information of the second priority;
a demodulation reference signal;
a physical uplink shared channel PUSCH;
a physical uplink control channel PUCCH;
a demodulation reference signal of a fourth priority, where a priority of the demodulation reference signal includes a third priority and the fourth priority, and the third priority is higher than the fourth priority;
a PUSCH of a sixth priority, where the PUSCH includes a fifth priority and the sixth priority, and the fifth priority is higher than the sixth priority; or
a PUCCH of an eighth priority, where the PUCCH includes a seventh priority and an eighth priority, and the seventh priority is higher than the eighth priority.

In an information transmission apparatus of this embodiment of this application, the priority of the positioning information is determined according to a priority function, and the priority function is related to at least one of the following:
a type of the positioning information;
a periodicity feature of the positioning information;
content of the positioning information;
a request indication of the positioning information;
an index of a serving cell;
an index of the positioning information; or
a reporting index of the positioning information.

In an information transmission apparatus of this embodiment of this application, the first sending module is configured to send, in a case that at least two resources overlap, a first resource according to a transmission priority of the at least two resources, where
the first resource is the physical channel used for transmitting the positioning information.

In an information transmission apparatus of this embodiment of this application, the at least two resources include the first resource and a second resource; and
a combination of the first resource and the second resource includes at least one of the following:
the first resource is the physical channel used for transmitting the positioning information, the second resource is a PUSCH used for transmitting first other information, and the first other information is information other than the positioning information;
the first resource is the physical channel used for transmitting the positioning information, and the second resource is a PUCCH used for transmitting the first other information;
the first resource is the physical channel used for transmitting the positioning information, and the second resource is a demodulation reference signal or an uplink positioning signal;
the first resource is a physical channel used for transmitting aperiodic positioning information, the second resource is a PUCCH used for transmitting second other information, and the second other information is information other than the aperiodic positioning information;
the first resource is the physical channel used for transmitting the aperiodic positioning information, and the second resource is a periodic or semi-persistent physical channel used for transmitting the positioning information;
the first resource is the physical channel used for transmitting the aperiodic positioning information, and the second resource is a PUSCH scheduled for transmitting the second other information; or
the first resource is a resource corresponding to the physical channel used for transmitting the aperiodic positioning information, and the second resource is the demodulation reference signal or the uplink positioning signal.

In an information transmission apparatus of this embodiment of this application, a transmission priority of the first resource is higher than a transmission priority of the second resource.

In an information transmission apparatus of this embodiment of this application, the at least two resources include the first resource and a second resource; and the first resource is the physical channel used for transmitting the positioning information, and the second resource includes at least one of the following:
a PUSCH or a PUCCH carrying aperiodic channel state information CSI;
a PUSCH or a PUCCH carrying a hybrid automatic repeat request acknowledgement HARQ-ACK;
a PUSCH or a PUCCH carrying a scheduling request SR;
a PUSCH or a PUCCH carrying a semi-persistent or periodic CSI report;
a PUSCH or a PUCCH carrying a periodic or semi-persistent layer 1 reference signal received power L1-RSRP report;
a PUSCH carrying a fifth priority, where the PUSCH includes the fifth priority and a sixth priority, and the fifth priority is higher than the sixth priority; or
a PUCCH carrying a seventh priority, where the PUCCH includes the seventh priority and an eighth priority, and the seventh priority is higher than the eighth priority.

In an information transmission apparatus of this embodiment of this application, a transmission priority of the first resource is lower than a transmission priority of the second resource.

In an information transmission apparatus of this embodiment of this application, in a case that the physical channel used for transmitting the positioning information is the PUCCH, the positioning information further includes:
indication information, where the indication information is used for indicating that information to be reported is the location information or the location measurement information.

In an information transmission apparatus of this embodiment of this application, the positioning information is determined according to a resource of the PUCCH, or the positioning information is determined according to a type of the PUCCH.

In an information transmission apparatus of this embodiment of this application, there is a correspondence between the positioning information and bits used for transmitting the positioning information, and the correspondence is specified in a protocol.

In an information transmission apparatus of this embodiment of this application, in a case that the physical channel used for transmitting the positioning information is the CG PUSCH, configuration information of the configured grant PUSCH includes at least one of the following:
a period;
a time domain offset;
a priority;
indication information; or
resource information.

An information transmission apparatus of this embodiment of this application further includes:
an activation module, configured to activate, in a case that the physical channel used for transmitting the positioning information is the configured grant PUSCH, the configured grant PUSCH in at least one of the following manners;
activate the configured grant PUSCH through DCI scrambled by a configured scheduling-radio network temporary identifier CS-RNTI;
activate the configured grant PUSCH through RRC configuration;
simultaneously activate the configured grant PUSCH through activating reference signal measurement; or
activate the configured grant PUSCH through a medium access control control element MAC CE.

An information transmission apparatus of this embodiment of this application further includes:
a deactivation module, configured to deactivate, in a case that the physical channel used for transmitting the positioning information is the configured grant PUSCH, the configured grant PUSCH in at least one of the following manners;
deactivate the configured grant PUSCH through DCI scrambled by a CS-RNTI;
deactivate the configured grant PUSCH through RRC reconfiguration;
simultaneously deactivate the configured grant PUSCH through deactivating reference signal measurement;
deactivate the configured grant PUSCH through a MAC CE; or
deactivate the configured grant PUSCH through timer expiration.

In the information transmission apparatus of this embodiment of this application, positioning information is reported through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted through the PUCCH or multiplexed to the PUSCH for transmission, high-layer parsing is not required, which may effectively reduce a reporting latency, thereby meeting a low-latency location service.

The channel transmission apparatus in this embodiment of this application may be an apparatus, and may also be a component in a terminal, an integrated circuit, or a chip. The apparatus may be a mobile terminal, or may be a non-mobile terminal. For example, the mobile terminal may include, but is not limited to, a type of the terminal 11 listed above, and a non-mobile terminal may be a server, a network attached storage (NAS), a personal computer (PC), a television (television, TV), a cash machine, a self-service machine, or the like, which is not specifically limited in this embodiment of this application.

The information transmission apparatus in this embodiment of this application may be an apparatus having an operating system. The operating system may be an Android (Android) operating system, may be an ios operating system, and may further be another possible operating system, which is not specifically limited in this embodiment of this application.

The information transmission apparatus provided in this embodiment of this application may implement various processes of the method embodiments in FIG. 1 to FIG. 2, and implement the same technical effect, which will not be described in detail herein again to avoid repetition.

Figure 5:
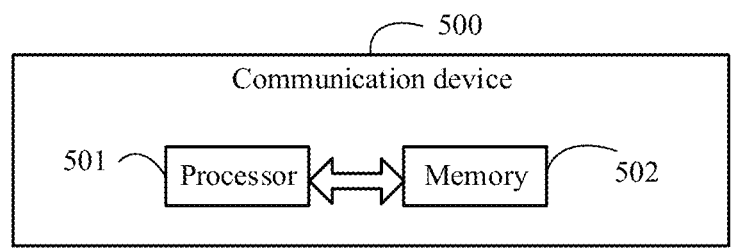
FIG. 5 is a structural block diagram of a communication device according to an embodiment of this application.

Optionally, as shown in FIG. 5, this embodiment of this application further provides a communication device 500, including a processor 501, a memory 502, and a program or instruction stored on the memory 502 and executable on the processor 501. For example, when the communication device 500 is a terminal, the program or instruction is executed by the processor 501 to implement the various processes of the information transmission method embodiment applied to the terminal, and may implement the same technical effect. When the communication device 500 is a network-side device, the program or the instruction is executed by the processor 501 to implement the various processes applied to the information transmission method embodiment on the network-side device, and may implement the same technical effect, which will not be described in detail herein again to avoid repetition.

Figure 6:
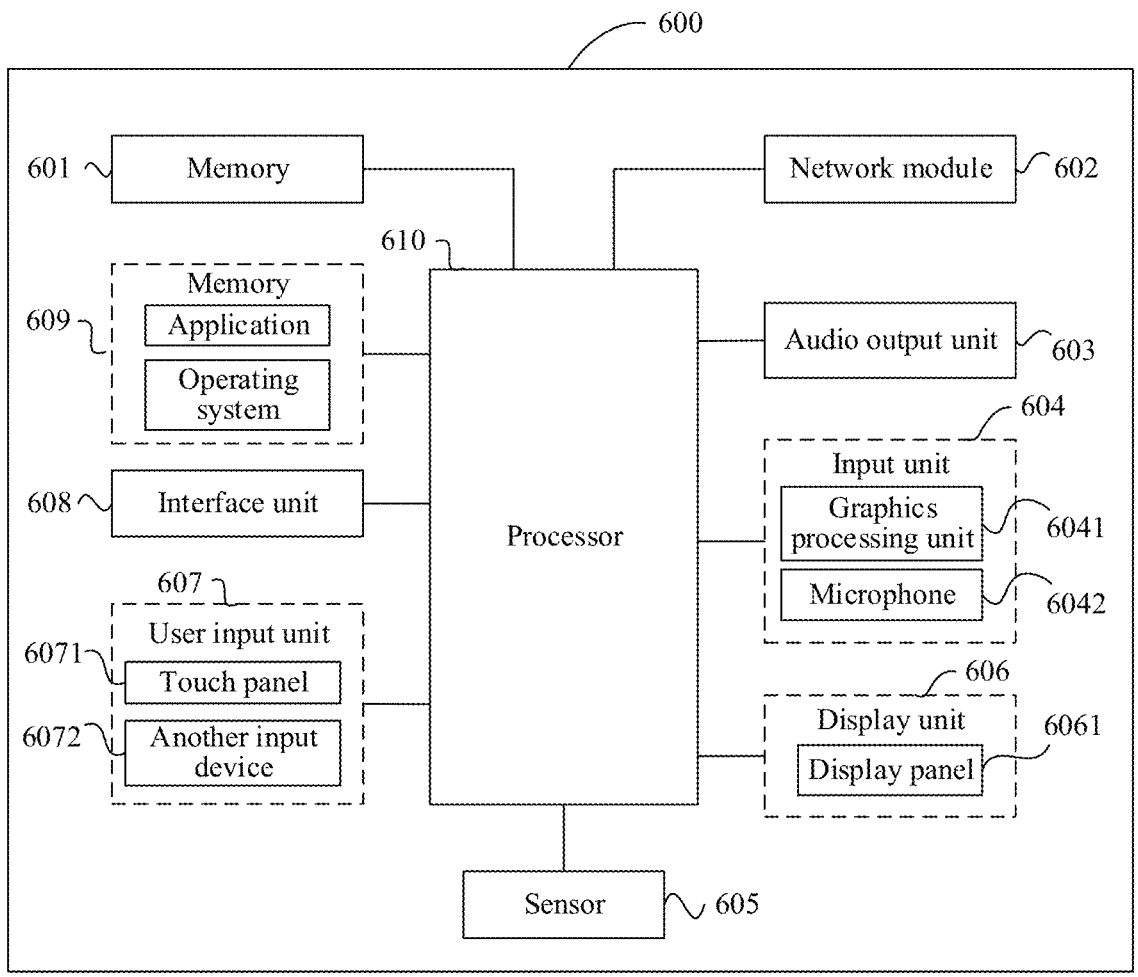
FIG. 6 is a structural block diagram of a terminal according to an embodiment of this application.

FIG. 6 is a schematic diagram of a hardware structure of a terminal according to an embodiment of this application.

The terminal 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the terminal 600 may further include the power supply (such as a battery) for supplying power to the components. The power supply may be logically connected to the processor 610 by a power management system, thereby implementing functions such as charging, discharging, and power consumption management by using the power management system. A terminal structure shown in FIG. 6 does not constitute a limitation to the terminal, and the terminal may include more or fewer components than those shown in the figure, or some components may be combined, or a different component deployment may be used, and details are not repeated herein.

It should be understood that, in this embodiment of this application, the input unit 604 may include a graphics processing unit (GPU) 6041 and a microphone 6042. The graphics processing unit 6041 performs processing on image data of a static picture or a video that is obtained by an image acquisition apparatus (for example, a camera) in a video acquisition mode or an image acquisition mode. The display unit 606 may include a display panel 6061, and the display panel 6061 may be configured by using a liquid crystal display, an organic light-emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include, but not limited to, a physical keyboard, a functional key (such as a volume control key or a switch key), a track ball, a mouse, and a joystick, which are not described herein in detail.

In this embodiment of this application, the radio frequency unit 601 receives downlink data from a network-side device and transmits the downlink data to the processor 610 for processing; and sends uplink data to the network-side device. Generally, the radio frequency unit 601 includes, but is not limited to, an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area. The program or instruction storage area may store an operating system, an application program or instruction required by at least one function (such as a sound playback function and an image display function), and the like. In addition, the memory 609 may include a high-speed random access memory, and may further include non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. Such as at least one magnetic disk storage device, a flash memory device, or other non-volatile solid-state storage devices.

The processor 610 may include one or more processing units; and optionally, the processor 610 may integrate an application processor and a modem processor. The application processor mainly processes an operating system, a user interface, an application program or instruction, and the like. The modem processor mainly processes wireless communication, such as a baseband processor. It may be understood that the foregoing modem may either not be integrated into the processor 610.

The processor 610 is configured to determine a physical channel used for transmitting positioning information, where the physical channel includes at least one of a physical uplink control channel PUCCH or a physical uplink shared channel PUSCH; and the radio frequency unit 601 is configured to send the physical channel, where the positioning information is mapped to the physical channel.

In the terminal of this embodiment of this application, positioning information is reported through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted through the PUCCH or multiplexed to the PUSCH for transmission, high-layer parsing is not required, which may effectively reduce a reporting latency, thereby meeting a low-latency location service.

Optionally, the PUSCH includes a configured grant PUSCH.

Optionally, the positioning information includes at least one of the following:
  location information;
  location measurement information; or
  positioning state information.

Optionally, the positioning state information includes at least one of the following:
  a spatial relation;
  positioning auxiliary information;
  related information of a path loss reference signal;
  a resource request;
  a size of a resource request;
  a reported location information type;
  information indicating an insufficient resource;
  information indicating that a positioning signal or positioning auxiliary information is not received;
  information indicating that enough positioning signals or enough positioning auxiliary information is not received;
  relationship information of a reporting resource and a measurement window;
  relationship information of a reporting resource and a measurement time; or
  hybrid automatic retransmission request HARQ information.

Optionally, the processor 610 is further configured to determine the physical channel used for transmitting the positioning information according to first information; and
  the first information includes at least one of the following:
  feature information of the positioning information; or
  feature information of the physical channel.

Optionally, the feature information of the positioning information includes at least one of the following:
  a periodicity feature of the positioning information, content of the positioning information, or a priority of the positioning information; and/or the feature information of the physical channel includes at least one of the following:
a type of the physical channel,
a scheduling time of the physical channel, or a scheduling resource of the physical channel.

Optionally, the radio frequency unit 601 is configured to, according to a mapping rule, map the positioning information to the physical channel, and send the physical channel, where
the mapping rule includes a first mapping rule specified in a protocol, a second mapping rule indicated by higher layer signaling, or a third mapping rule indicated by downlink control information DCI.

Optionally, the radio frequency unit 601 is configured to determine a mapping priority of the positioning information; and
according to the mapping priority of the positioning information, mapping the positioning information to the physical channel, and sending the physical channel.

Optionally, the radio frequency unit 601 is configured to preferentially map, in a case that the mapping priority of the positioning information is higher than a mapping priority of first information, the positioning information to the physical channel, where the first information is information that needs to be mapped to the physical channel.

Optionally, the radio frequency unit 601 is configured to determine the mapping priority of the positioning information according to second information sent by a network device, features of the positioning information, and/or a protocol agreement.

Optionally, the radio frequency unit 601 is configured to send the physical channel according to a transmission priority of the physical channel used for transmitting the positioning information.

Optionally, the transmission priority is determined according to a priority of the physical channel, features of the positioning information, and/or second information sent by a network device.

Optionally, the second information is used for indicating at least one of the following:
the priority of the physical channel used for transmitting the positioning information;
a priority of the positioning information; or
the mapping priority of the positioning information.

Optionally, the second information is carried by request information of the positioning information, or the second information is carried by downlink control information DCI, or the second information is carried by a radio resource control RRC message, or the second information is carried by a media access layer control MAC message.

Optionally, the priority of the positioning information includes at least a first priority and a second priority; and
a transmission priority of positioning information of the first priority is higher than a transmission priority of at least one of the following:
a physical channel that transmits positioning information of the second priority;
a demodulation reference signal;
a physical uplink shared channel PUSCH;
a physical uplink control channel PUCCH;
a demodulation reference signal of a fourth priority, where a priority of the demodulation reference signal includes a third priority and the fourth priority, and the third priority is higher than the fourth priority;
a PUSCH of a sixth priority, where the PUSCH includes a fifth priority and the sixth priority, and the fifth priority is higher than the sixth priority; or
a PUCCH of an eighth priority, where the PUCCH includes a seventh priority and an eighth priority, and the seventh priority is higher than the eighth priority.

Optionally, the priority of the positioning information is determined according to a priority function, and the priority function is related to at least one of the following:
a type of the positioning information;
a periodicity feature of the positioning information;
content of the positioning information;
a request indication of the positioning information;
an index of a serving cell;
an index of the positioning information; or
a reporting index of the positioning information.

Optionally, the radio frequency unit 601 is configured to send, in a case that at least two resources overlap, a first resource according to a transmission priority of the at least two resources, where
the first resource is the physical channel used for transmitting the positioning information.

Optionally, the at least two resources include the first resource and a second resource; and
a combination of the first resource and the second resource includes at least one of the following:
the first resource is the physical channel used for transmitting the positioning information, the second resource is a PUSCH used for transmitting first other information, and the first other information is information other than the positioning information;
the first resource is the physical channel used for transmitting the positioning information, and the second resource is a PUCCH used for transmitting the first other information;
the first resource is the physical channel used for transmitting the positioning information, and the second resource is a demodulation reference signal or an uplink positioning signal;
the first resource is a physical channel used for transmitting aperiodic positioning information, the second resource is a PUCCH used for transmitting second other information, and the second other information is information other than the aperiodic positioning information;
the first resource is the physical channel used for transmitting the aperiodic positioning information, and the second resource is a periodic or semi-persistent physical channel used for transmitting the positioning information;
the first resource is the physical channel used for transmitting the aperiodic positioning information, and the second resource is a PUSCH scheduled for transmitting the second other information; or
the first resource is a resource corresponding to the physical channel used for transmitting the aperiodic positioning information, and the second resource is the demodulation reference signal or the uplink positioning signal.

Optionally, a transmission priority of the first resource is higher than a transmission priority of the second resource.

Optionally, the at least two resources include the first resource and a second resource; and
the first resource is the physical channel used for transmitting the positioning information, and the second resource includes at least one of the following:
a PUSCH or a PUCCH carrying aperiodic channel state information CSI;
a PUSCH or a PUCCH carrying a hybrid automatic repeat request acknowledgement HARQ-ACK;

a PUSCH or a PUCCH carrying a scheduling request SR;

a PUSCH or a PUCCH carrying a semi-persistent or periodic CSI report;

a PUSCH or a PUCCH carrying a periodic or semi-persistent layer 1 reference signal received power L1-RSRP report;

a PUSCH carrying a fifth priority, where the PUSCH includes the fifth priority and a sixth priority, and the fifth priority is higher than the sixth priority; or a PUCCH carrying a seventh priority, where the PUCCH includes the seventh priority and an eighth priority, and the seventh priority is higher than the eighth priority.

Optionally, a transmission priority of the first resource is lower than a transmission priority of the second resource.

Optionally, in a case that the physical channel used for transmitting the positioning information is the PUCCH, the positioning information further includes:

indication information, where the indication information is used for indicating that information to be reported is the location information or the location measurement information.

Optionally, the positioning information is determined according to a resource of the PUCCH, or the positioning information is determined according to a type of the PUCCH.

Optionally, there is a correspondence between the positioning information and bits used for transmitting the positioning information, and the correspondence is specified in a protocol.

Optionally, in a case that the physical channel used for transmitting the positioning information is the CG PUSCH, configuration information of the configured grant PUSCH includes at least one of the following:

a period;

a time domain offset;

a priority;

indication information; or resource information.

Optionally, the processor 610 is further configured to activate, in a case that the physical channel used for transmitting the positioning information is the configured grant PUSCH, the configured grant PUSCH in at least one of the following manners;

activate the configured grant PUSCH through DCI scrambled by a configured scheduling-radio network temporary identifier CS-RNTI;

activate the configured grant PUSCH through RRC configuration;

simultaneously activate the configured grant PUSCH through activating reference signal measurement; or activate the configured grant PUSCH through a medium access control control element MAC CE.

Optionally, the processor 610 is further configured to deactivate, in a case that the physical channel used for transmitting the positioning information is the configured grant PUSCH, the configured grant PUSCH in at least one of the following manners;

deactivate the configured grant PUSCH through DCI scrambled by a CS-RNTI;

deactivate the configured grant PUSCH through RRC reconfiguration;

simultaneously deactivate the configured grant PUSCH through deactivating reference signal measurement;

deactivate the configured grant PUSCH through a MAC CE; or deactivate the configured grant PUSCH through timer expiration.

In the terminal of this embodiment of this application, positioning information is reported through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted through the PUCCH or multiplexed to the PUSCH for transmission, high-layer parsing is not required, which may effectively reduce a reporting latency, thereby meeting a low-latency location service.

It should be noted that, in the information transmission method provided in this embodiment of this application, the execution entity may be an information transmission apparatus, or a control module configured to perform the information transmission method in the information transmission apparatus. In the embodiments of this application, the information transmission apparatus performing the information transmission method is used as an example to describe the channel transmission apparatus provided in this application.

Figure 7:
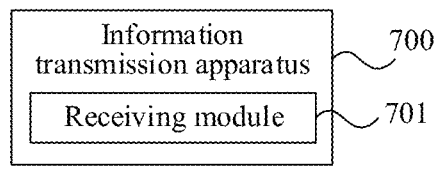
FIG. 7 is a schematic diagram 2 of a module of an information transmission apparatus according to an embodiment of this application.

As shown in FIG. 7, this embodiment of this application further provides an information transmission apparatus 700, applied to a network-side device, the method including:

a receiving module 701, configured to receive a physical channel to which positioning information is mapped, where the physical channel includes at least one of a physical uplink control channel PUCCH or a physical uplink shared channel PUSCH.

In an information transmission apparatus of this embodiment of this application, the PUSCH includes a configured grant PUSCH.

An information transmission apparatus of this embodiment of this application further includes:

a second sending module, configured to send, before the receiving a physical channel to which positioning information is mapped, second information, where the second information is used for indicating at least one of the following:

the priority of the physical channel used for transmitting the positioning information;

a priority of the positioning information; or the mapping priority of the positioning information.

In an information transmission apparatus of this embodiment of this application, the second information is carried by request information of the positioning information, or the second information is carried by downlink control information DCI, or the second information is carried by a radio resource control RRC message, or the second information is carried by a MAC message.

An information transmission apparatus of this embodiment of this application further includes:

a second sending module, configured to send, before the receiving a physical channel to which positioning information is mapped, second information, where the second information is used for indicating at least one of the following:

the priority of the physical channel used for transmitting the positioning information;

a priority of the positioning information; or the mapping priority of the positioning information.

An information transmission apparatus of this embodiment of this application further includes:

an obtaining module, configured for a second sending module to send higher layer indication signaling, and before sending DCI, obtain a capability of the terminal, where the capability of the terminal includes a capability of whether supporting to map the positioning information to the physical channel.

An information transmission apparatus of this embodiment of this application further includes:

a third sending module, configured to transmit, in a case that the physical channel used for transmitting the positioning information is the configured grant PUSCH, at least one of the following activation signaling, where the activation signaling is used for activating the configured grant PUSCH;

DCI activation signaling scrambled by a CS-RNTI;

RRC activation signaling;

reference signal measurement activation signaling; or medium access control control element MAC CE activation signaling.

An information transmission apparatus of this embodiment of this application further includes:

a fourth sending module, configured to transmit, in a case that the physical channel used for transmitting the positioning information is the configured grant PUSCH, at least one of the following deactivation signaling, where the deactivation signaling is used for deactivating the configured grant PUSCH;

DCI deactivation signaling scrambled by a CS-RNTI;

RRC deactivation signaling;

reference signal measurement deactivation signaling; or medium access control control element MAC CE deactivation signaling.

In the information transmission apparatus of this embodiment of this application, positioning information reported by a terminal is received through at least one of a PUCCH and a PUSCH, which increases a resource of transmitting the positioning information. That is, more resources may be scheduled to transmit the positioning information, so as to improve a matching degree between the currently scheduled resource and a reporting requirement of the positioning information. In addition, when the positioning information is transmitted or multiplexed to the PUSCH for transmission through the PUCCH, high-layer parsing is not required, which may effectively reduce a reporting latency, thereby meeting a low-latency location service.

Figure 8:
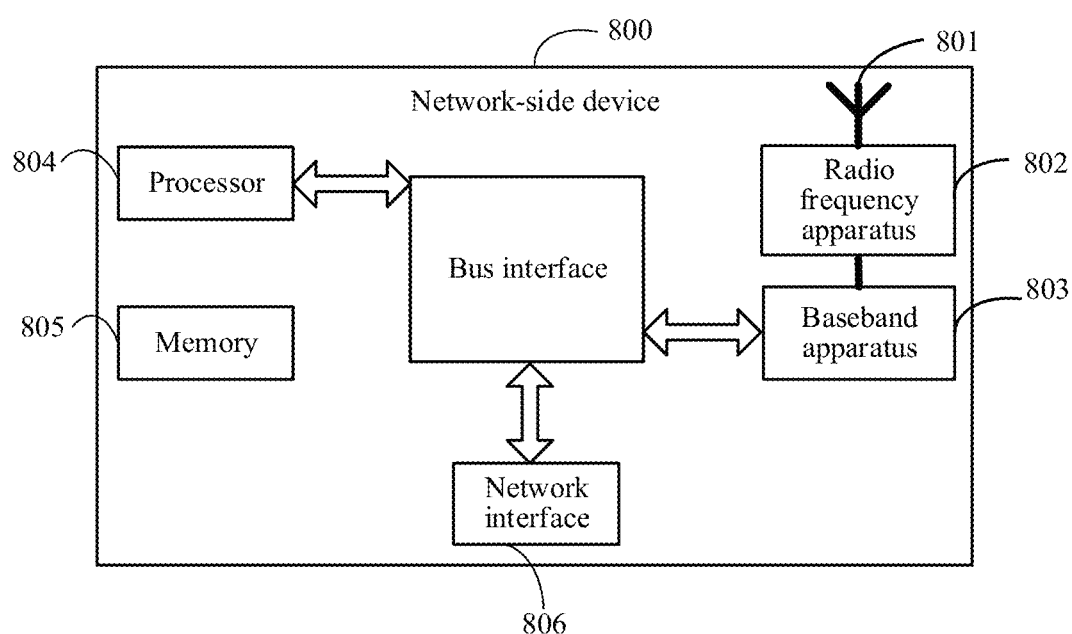
FIG. 8 is a structural block diagram of a network-side device according to an embodiment of this application.

Alternatively, an embodiment of this application further provides a network-side device. As shown in FIG. 8, the network device 800 includes: an antenna 801, a radio frequency apparatus 802, and a baseband apparatus 803. The antenna 801 is connected with the radio frequency apparatus 802. In an uplink direction, the radio frequency apparatus 802 receives information through the antenna 801, and sends the received information to the baseband apparatus 803 for processing. In a downlink direction, the baseband device 803 performs processing on the to-be-sent information, and transmits the to-be-sent information to the radio frequency apparatus 802. After performing processing on the received information, the radio frequency apparatus 802 transmits the received information out through the antenna 81.

The frequency band processing apparatus may be located in the baseband apparatus 803, and the method performed by the network-side device in the foregoing embodiments may be implemented in the baseband apparatus 803. The baseband apparatus 803 includes a processor 804 and a memory 805.

The baseband apparatus 803 may include, for example, at least one baseband board, and a plurality of chips are arranged on the baseband board. As shown in FIG. 8, for example, one of the chips is a processor 804, and is connected with the memory 805, to invoke the program in the memory 805, and to perform the network device operation shown in the foregoing method embodiments.

The baseband apparatus 803 may further include a network interface 806 used for exchanging information with the radio frequency apparatus 802. For example, the interface is a common public radio interface (CPRI).

Alternatively, the network-side device of this embodiment of the present disclosure further includes: an instruction or program stored on the memory 805 and executable on the processor 804. The processor 804 invokes the instruction or program in the memory 805 to perform the method performed by each module shown in FIG. 7, and implements the same technical effect, which will not be described in detail herein again to avoid repetition.

This embodiment of this application further provides a readable storage medium storing therein a program or instruction. The program or instruction, when executed by a processor, implements various processes of the embodiments of the information transmission method, and the same technical effects may be achieved, which will not be described in detail herein again to avoid repetition.

The processor is a processor in the terminal described in the foregoing embodiment. The readable storage medium includes a computer-readable storage medium, for example, a Read-Only Memory (ROM), a Random Access Memory (RAM), a magnetic disk, an optical disc or the like.

This embodiment of this application further provides a chip. The chip includes a processor and a communication interface. The communication interface is coupled to the processor. The processor is configured to run a program or instruction to implement various processes of the embodiments of the information transmission method described above, and the same technical effects may be achieved, which will not be described in detail herein again to avoid repetition.

It should be understood that, the chip mentioned in this embodiment of this application may also be referred to as a system-level chip, a system chip, a chip system, a system on chip, or the like.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for specific working processes of the foregoing described system, apparatus and unit, reference can be made to the corresponding processes in the foregoing method embodiments, and details are not described herein.

In the several embodiments provided in this application, it should be understood that the disclosed apparatus and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

It may be understood that, the embodiments described in the embodiments of the present disclosure may be implemented by using software, hardware, firmware, middleware, microcode, or a combination thereof. For hardware implementation, a module, a unit, and a sub-unit may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in the pretransmitted disclosure, or a combination of the above.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented in the processor or outside the processor.

Although the embodiments of this application have been described above with reference to the accompanying drawings, this application is not limited to the specific implementations described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An information transmission method performed by a terminal, comprising:
    determining a physical channel used for transmitting positioning information, wherein the physical channel comprises at least one of a physical uplink control channel (PUCCH) or a physical uplink shared channel (PUSCH); and
    sending the physical channel, wherein the positioning information is mapped to the physical channel;
    wherein the determining a physical channel used for transmitting positioning information comprises:
    determining the physical channel used for transmitting the positioning information according to first information; and
    the first information comprises at least one of the following:
    feature information of the positioning information; or
    feature information of the physical channel;
    wherein the feature information of the positioning information comprises at least one of the following:
    a periodicity feature of the positioning information, content of the positioning information, or a priority of the positioning information; and/or
    the feature information of the physical channel comprises at least one of the following:
    a type of the physical channel,
    a scheduling time of the physical channel, or a scheduling resource of the physical channel.

2. The information transmission method according to claim 1, wherein the PUSCH comprises a configured grant PUSCH.

3. The information transmission method according to claim 1, wherein the positioning information comprises at least one of the following:
    location information;
    location measurement information; or
    positioning state information.

4. The information transmission method according to claim 1, wherein the sending the physical channel comprises:
    according to a mapping rule, mapping the positioning information to the physical channel, and sending the physical channel, wherein
    the mapping rule comprises a first mapping rule specified in a protocol, a second mapping rule indicated by higher layer signaling, or a third mapping rule indicated by downlink control information (DCI).

5. The information transmission method according to claim 1, wherein the sending the physical channel comprises:
    determining a mapping priority of the positioning information; and according to the mapping priority of the positioning information, mapping the positioning information to the physical channel, and sending the physical channel.

6. The information transmission method according to claim 5, wherein the according to the mapping priority of the positioning information, mapping the positioning information to the physical channel comprises:
in a case that the mapping priority of the positioning information is higher than a mapping priority of first information, preferentially mapping the positioning information to the physical channel, wherein the first information is information that needs to be mapped to the physical channel.

7. The information transmission method according to claim 5, wherein the determining a mapping priority of the positioning information comprises:
determining the mapping priority of the positioning information according to second information sent by a network device, features of the positioning information, and/or a protocol agreement.

8. The information transmission method according to claim 1, wherein the sending the physical channel comprises:
sending the physical channel according to a transmission priority of the physical channel used for transmitting the positioning information.

9. The information transmission method according to claim 8, wherein the transmission priority is determined according to a priority of the physical channel, features of the positioning information, and/or second information sent by a network device.

10. The information transmission method according to claim 7, wherein the second information is used for indicating at least one of the following:
the priority of the physical channel used for transmitting the positioning information;
a priority of the positioning information; or
the mapping priority of the positioning information.

11. The information transmission method according to claim 10, wherein the second information is carried by request information of the positioning information, or the second information is carried by downlink control information (DCI), or the second information is carried by a radio resource control (RRC) message, or the second information is carried by a media access layer control (MAC) message.

12. The information transmission method according to claim 8, wherein the sending the physical channel according to a transmission priority of the physical channel used for transmitting the positioning information comprises:
in a case that at least two resources overlap, sending a first resource according to transmission priorities of the at least two resources, wherein
the first resource is the physical channel used for transmitting the positioning information.

13. The information transmission method according to claim 1, wherein in a case that the physical channel used for transmitting the positioning information is the PUCCH, the positioning information further comprises:
indication information, wherein the indication information is used for indicating that information to be reported is the location information or the location measurement information.

14. The information transmission method according to claim 2, wherein in a case that the physical channel used for transmitting the positioning information is the configured grant PUSCH, configuration information of the configured grant PUSCH comprises at least one of the following:

a period;
a time domain offset;
a priority;
indication information; or
resource information.

15. The information transmission method according to claim 2, further comprising:
in a case that the physical channel used for transmitting the positioning information is the configured grant PUSCH, activating the configured grant PUSCH in at least one of the following manners;
activating the configured grant PUSCH through DCI scrambled by a configured scheduling-radio network temporary identifier (CS-RNTI);
activating the configured grant PUSCH through RRC configuration;
simultaneously activating the configured grant PUSCH through activating reference signal measurement; or
activating the configured grant PUSCH through a medium access control control element (MAC CE).

16. The information transmission method according to claim 2, further comprising:
in a case that the physical channel used for transmitting the positioning information is the configured grant PUSCH, deactivating the configured grant PUSCH in at least one of the following manners;
deactivating the configured grant PUSCH through DCI scrambled by a CS-RNTI;
deactivating the configured grant PUSCH through RRC reconfiguration;
simultaneously deactivating the configured grant PUSCH through deactivating reference signal measurement;
deactivating the configured grant PUSCH through a MAC CE; or
deactivating the configured grant PUSCH through timer expiration.

17. A terminal, comprising:
a processor; and
a memory storing a program or instruction that is executable on the processor, wherein the program or instruction, when executed by the processor, causes the terminal to:
determine a physical channel used for transmitting positioning information, wherein the physical channel comprises at least one of a physical uplink control channel (PUCCH) or a physical uplink shared channel (PUSCH); and
send the physical channel, wherein the positioning information is mapped to the physical channel;
wherein the determining a physical channel used for transmitting positioning information comprises:
determining the physical channel used for transmitting the positioning information according to first information; and
the first information comprises at least one of the following:
feature information of the positioning information; or
feature information of the physical channel;
wherein the feature information of the positioning information comprises at least one of the following:
a periodicity feature of the positioning information, content of the positioning information, or a priority of the positioning information; and/or the feature information of the physical channel comprises at least one of the following:

a type of the physical channel, a scheduling time of the physical channel, or a scheduling resource of the physical channel.

18. A network-side device, comprising:

a processor; and a memory storing a program or instruction that is executable on the processor, wherein the program or instruction, when executed by the processor, causes the network-side device to:

receive a physical channel to which positioning information is mapped, wherein the physical channel comprises at least one of a physical uplink control channel (PUCCH) or a physical uplink shared channel (PUSCH);

wherein the determining a physical channel used for transmitting positioning information comprises:

determining the physical channel used for transmitting the positioning information according to first information; and the first information comprises at least one of the following:

feature information of the positioning information; or feature information of the physical channel;

wherein the feature information of the positioning information comprises at least one of the following:

a periodicity feature of the positioning information, content of the positioning information, or a priority of the positioning information; and/or the feature information of the physical channel comprises at least one of the following:

a type of the physical channel, a scheduling time of the physical channel, or a scheduling resource of the physical channel.

\* \* \* \* \*